(12) United States Patent
Endo et al.

(10) Patent No.: US 6,980,700 B2
(45) Date of Patent: Dec. 27, 2005

(54) IMAGE PROCESSING APPARATUS AND METHOD OF STORAGE MEDIUM

(75) Inventors: Yoshiyuki Endo, Yokohama (JP); Shinichi Matsumoto, Yokohama (JP); Kiyoshi Iwabuchi, Fuchu (JP); Mamoru Ozawa, Yamato (JP); Hideki Narushima, Fujisawa (JP); Masato Hasegawa, Setagaya-ku (JP); Tatsuya Hisatomi, Shibuya-ku (JP)

(73) Assignee: Canon Kabushiki Kaisha (JP)

( * ) Notice: Subject to any disclaimer, the term of this patent is extended or adjusted under 35 U.S.C. 154(b) by 593 days.

(21) Appl. No.: 09/739,352

(22) Filed: Dec. 18, 2000

(65) Prior Publication Data

US 2001/0026644 A1 Oct. 4, 2001

(30) Foreign Application Priority Data

Dec. 17, 1999 (JP) .......................................... 11-358847

(51) Int. Cl.[7] .............................................. G06K 9/36
(52) U.S. Cl. ...................................................... 382/284
(58) Field of Search .................. 382/284; 358/450–453, 358/540

(56) References Cited

U.S. PATENT DOCUMENTS 5,581,377 A * 12/1996 Shimizu et al. ............. 382/284
5,585,945 A * 12/1996 Ikeda et al. ................. 358/540
5,732,161 A *  3/1998 Kuroda et al. .............. 382/284
6,222,637 B1 *  4/2001 Ito et al. ..................... 382/284
6,328,693 B1 * 12/2001 Miyatake et al. ........... 600/437
6,470,100 B2 * 10/2002 Horiuchi ..................... 382/284

FOREIGN PATENT DOCUMENTS

JP           9-149307 A      6/1997
JP          11-331699 A     11/1999

* cited by examiner

Primary Examiner—Jingge Wu
(74) Attorney, Agent, or Firm—Rossi, Kimms & McDowell, LLP

(57) ABSTRACT

There is provided an image processing apparatus and an image processing method which are capable of inserting in real time a desired image into a desired portion of a desired created frame image or a desired previously captured image to enable an operator to synthesize the images with a simple operation without using a personal computer, and a storage medium storing a program for executing the image processing method. An image of an object obtained by photographing the object is input in real time as digital object image data. Frame image data comprising characters and graphics is created. At least one area of the created frame image where the input object image data is to be inserted is designated. The created frame image data is displayed, and the input object image data is inserted into the designated area of the displayed frame image and the designated area with the input object image data inserted therein is displayed. The inserted and displayed object image data is established.

36 Claims, 14 Drawing Sheets

IMAGE PROCESSING APPARATUS AND METHOD OF STORAGE MEDIUM

BACKGROUND OF THE INVENTION

1. Field of the Invention

The present invention relates to an image processing apparatus such as a digital camera which is provided with a handwriting input section and which records captured images in the form of digital signals, and an image processing method, and a storage medium storing a program for executing the image processing method.

2. Description of the Related Art

A digital camera which is provided with a handwriting input section is conventionally known. A digital camera section and a handwriting input section of the conventional digital camera will be described below in this order.

FIG. 11 is a block diagram schematically showing the configuration of a conventional digital camera provided with a handwriting input section that enables a user to input handwritten characters or designate positions using a touch pen.

After the power is turned on, when an operation mode switch is set to a photographing operation mode, a camera module 17 including a CCD 12 and a CCD control section 14 is initialized and enabled to shift into a state called "monitor" or "finder" to start operation of an LCD display section 30 that is an electronic view finder for allowing the user to check an object during the photographing operation mode operation. A flow of these operations will be described below.

First, optical information on an object captured through a group of camera lenses 10 is converted into an electric signal by means of the CCD 12 which is of the progressive scan type. The converted or analog signal is subjected to a noise removal process and a gain process and then subjected to A/D conversion, for example, into a 10-bit digital signal by means of the CCD control section 14, which is then transmitted to an image processing section 16. The image processing section 16 carries out processes such as automatic white balancing, AE, or corrections for stroboscopic photographing, or signal conversion into a Y, Cb and Cr signal format (Y: luminance signal, Cb and Cr: color difference signals).

In order to increase a display processing speed and since the LCD display section 30 has a display resolution of, for example, about 320×240 pixels, the converted signals in the Y, Cb and Cr signal format are further converted by a CPU 18 into data of a reduced size of 320×240 pixels instead of all pixels, that is, 640×480 pixels using a decimation process. The signals are then written onto an area VRAM 22e reserved in a RAM 22 for storing image data to be displayed and are regularly output to an LCD control section 100 using DMA (direct memory access), that is, a function of the CPU that transfers data between memories or between a memory and a peripheral device with a minimum number of steps.

The LCD control section 100 converts the received Y, Cb and Cr signals into RGB digital signals and outputs them to a display driving section 28. The LCD display section 30 receives the output signals from the display driving section 28 and displays an image of the object.

The above processes are continuously repeated with a cycle of 1/30 seconds with which image data are output from the CCD 12, to allow the image of the object to be always monitored on the LCD display section 30.

Next, a description will be given of a flow of a process in a photographing operation mode and recording operation mode for capturing and recording an image.

To capture an image, an operator monitors the image in the photographing operation mode and depresses a shutter switch (SW) 32 in timing he desires. If the shutter switch SW 32 is depressed, various camera settings such as automatic white balancing, AE, and corrections for stroboscopic photographing which are controlled within the image processing section 16 are locked at the current set values, and the operations of the LCD control section 100, the display driving section 28, and the LCD display section 30 are stopped to reduce the processing load on the CPU 18.

Although the above-mentioned view finder process captures only a signal of the reduced number of pixels of the decimated image in order to increase the display processing speed, a full VGA (640×480 pixels) image is required as a captured image. The CPU 18 thus captures Y, Cb and Cr signals corresponding to the VGA pixels and writes data in these signals onto an image data expanding area 22a in the RAM 22 after execution of predetermined processes on the data by the image processing section 16.

The CPU 18 subjects the data to an image data compressing process according to the JPEG Standard, subsequently adds numerical data such as desired numbers or date data to the obtained data as a file name, and then writes them into a desired folder in this apparatus created inside a data storage section 102 (for example, a flash memory). Captured images are thus sequentially written into this folder.

Next, a description will be given of a flow of a process in a reproducing operation mode for reproducing the captured image for display.

When the power is turned on or when the operation mode switch is operated to switch the photographing operation mode to an image reproducing mode, the CPU 18 actuates the LCD display section 30, that is, the electronic view finder for allowing the user to check the captured image, to enter a data waiting state. The CPU 18 causes a group of arbitrary folders in this apparatus to be displayed to prompt the operator to select one of them. After a folder is selected, if a display image file is designated, the designated image is displayed over the entire screen as a VGA image. Without any designation, compressed image data files for an arbitrary number of images that can be displayed in a list as thumbnail images (for example, 80×60 pixels) are read out from the data storage section 102 in order of photographing date starting with the earliest one, and are written onto the image data expanding area 22a in the RAM 22. Then, an image data expanding process, that is, a process of converting the compressed data corresponding to the VGA pixels according to the JPEG Standard into the original data (Y, Cb and Cr data) is carried out, and the original data obtained by the data expanding process are converted into data of 320×240 pixels using a decimation process if the designated image is to be displayed, or are subjected to a decimation process for the thumb-nail display with 80×60 pixels if these images are to be displayed in a list. The thus processed data is subsequently output to the LCD control section 100.

The LCD control section 100 converts the received Y, Cb and Cr signals into RGB digital signals and writes the RGB data onto the area VRAM 22e that stores image data to be displayed, at addresses corresponding to designated desired display positions (coordinates), so that the data can be displayed at these display positions. Further, a warning of an amount of power remaining in the battery, various control messages, and others are also all converted into RGB data and written onto the area VRAM 22e at corresponding addresses.

After all data required for the display are written onto the area VRAM 22*e*, the LCD control section 100 outputs the RGB signals on the area VRAM 22*e* to the display driving section 28. On receiving the output signals from the display drive signal 28, the LCD display section 30 displays the image of the object.

In FIG. 11, reference numeral 101 designates a read only memory (RAM) that stores a control program to be executed by the CPU 18, and a power supply voltage output from a battery 35 as a power supply is adjusted by a DC/DC converter 36 to a value that is appropriate for various parts before being supplied thereto.

Next, the handwriting input section will be explained.

Conventional electronic I/O-integrated handwriting equipment is comprised of a display section and an input section which overlap each other and is operated with input means such as a pen or the operator's fingertip. This construction can be operated in the same manner as when characters or graphics are written or drawn on paper, by operating software-based switches on a display screen, displaying an input trace, or causing the equipment to recognize characters.

Further, if an application program is executed with such equipment, the operator uses a pen or his fingertip to select and execute a desired program while depressing icons or menus displayed on the small-sized display section.

When the operator touches a transparent tablet unit with a pen, control is provided such that voltages in X and Y directions corresponding to a point depressed by the pen are converted into digital data, and X and Y coordinates are detected based on these X and Y digital values, so that a dot on the LCD panel corresponding to the detected X and Y values is lighted or a key switch or a command displayed at a position corresponding to the detected X and Y coordinates is selected. The fixed display section is used to select main functions, and when it is depressed with the pen or the operator's fingertip, functions located at the depressed positions are read out, for example, from the ROM and processes or displays corresponding to the readout functions are carried out on the LCD panel Since, however, the above described conventional digital camera has only one display means, the process of reproducing the captured image and the process of monitoring the object for photographing cannot be simultaneously executed. Further, if part of an image being captured is to be pasted to a previously captured image, first, the current image must be captured and saved, and then the current and past image data must be transferred to the digital camera or a personal computer and synthesized using exclusive software.

Some of the latest digital cameras have a function like "Print Club" (an automatic camera installed in a town to provide small instant arranged photographs depending on a user's operation) which displays previously designed image data called "a frame" on an LCD display section and then displays a monitored image therein so that at the time of photographing, the image is loaded into the camera together with the frame. The frame, however, is fixed and cannot be freely designed by the operator. Thus, if a captured image is desired to be synthesized with a frame image designed and created by the operator, this cannot be realized unless the captured image is loaded into a personal computer where expensive software is used for image synthesis.

SUMMARY OF THE INVENTION

It is an object of the present invention to provide an image processing apparatus and an image processing method which are capable of inserting in real time a desired image into a desired portion of a desired created frame image or a desired previously captured image to enable an operator to synthesize the images with a simple operation without using a personal computer, and a storage medium storing a program for executing the image processing method.

To attain the above object, in a first aspect of the present invention, there is provided an image processing apparatus comprising input means for inputting in real time an image of an object obtained by photographing the object, as digital object image data, creating means for creating frame image data comprising characters and/or graphics, designating means for designating at least one area of the created frame image where the input object image data is to be inserted, display means for displaying the created frame image data and for inserting the input object image data into the designated area of the displayed frame image and displaying the designated area with the input object image data inserted therein, and establishing means for establishing the inserted and displayed object image data.

Preferably, the image processing apparatus according to the first aspect further comprises storage means that stores the established object image data.

More preferably, the image processing apparatus according to the first aspect further comprises saving means for saving the frame image data in which the established object image data is inserted and for saving information indicative of a storage location in the storage means where the object image data is stored.

To attain the above object, in a second aspect of the present invention, there is provided an image processing apparatus comprising input means for inputting in real time an image of an object obtained by photographing the object, as digital image data, establishing means for establishing the image data input in real time, storage means for storing the established image data, selecting means for selecting one of the image data stored in the storage means, display means for displaying the selected stored image data on a display screen, designating means for designating at least one area in the selected stored image data displayed on the display screen, and image synthesizing means for creating a synthesized image by inserting the image data input in real time and established by the establishing means into the designated area located in the selected past image data displayed on the display screen, and for displaying the created synthesized image by the display means.

Preferably, the designating means designates the area by means of handwriting input.

To attain the above object, in a third aspect of the present invention, there is provided an image processing apparatus comprising input means for inputting an image of an object obtained by photographing the object, as digital image data, establishing means for establishing the image data input in real time, storage means for storing the established image data, selecting means for selecting one of the image data stored in the storage means, display means for displaying the selected stored image data on a display screen, designating means for designating at least one position in the selected stored image data displayed on the display screen, generating means for generating a predetermined area including the designated position, on part of the display screen, and image synthesizing means for creating a synthesized image by inserting the image data input in real time and established by the establishing means into the predetermined area generated by the generating means located in the selected image data displayed on the display screen, and for displaying the created synthesized image by the display means.

Preferably, the image processing apparatus according to the third aspect further comprises changing means for changing a size of the predetermined area.

More preferably, the image processing apparatus according to the third aspect further comprises saving means for saving the synthesized image and for saving information indicative of a storage location in the storage means where the selected past image data from which the synthesized image data is created is stored.

To attain the above object, in a fourth aspect of the present invention, there is provided an image processing apparatus comprising input means for inputting an image of an object obtained by photographing the object, as digital image data, establishing means for establishing the image data input in real time, storage means for storing the established image data, selecting means for selecting one of the image data stored in the storage means, display means for displaying the selected stored image data a display screen, designating means for designating at least one position in the selected stored image data displayed on the display screen, erasing means for erasing image data of the selected image data displayed on the display screen located in at least one predetermined area including the designated position, and image synthesizing means for creating a synthesized image by inserting the image data input in real time and established by the establishing means into the predetermined area from which the image data has been erased, and for displaying the created synthesized image by the display means.

Preferably, the image processing apparatus according to the fourth aspect further comprises selecting means operable when the designating means designates a plurality of positions and the erasing means erases image data from a plurality of predetermined areas, for selecting one of the plurality of predetermined areas, and wherein the image synthesizing means creates the synthesized image by inserting the image data input in real time and established by the establishing means into the predetermined area selected by the selecting means, and for displaying the created synthesized image by the display means.

Also preferably, the image processing apparatus according to the fourth aspect further comprises changing means for changing a size of the predetermined area.

Preferably, the image processing apparatus according to the fourth aspect further comprises saving means for saving the synthesized image and for saving information indicative of a storage location in the storage means where the selected image data from which the synthesized image data is created is stored.

To attain the above object, in a fifth aspect of the present invention, there is provided an image processing method comprising the steps of inputting in real time an image of an object obtained by photographing the object, as digital object image data, creating frame image data comprising characters and/or graphics, designating at least one area of the created frame image where the input object image data is to be inserted, displaying the created frame image data and inserting the input object image data into the designated area of the displayed frame image, and displaying the designated area with the input object image data inserted therein, and establishing the inserted and displayed object image data.

Preferably, the image processing method according to the fifth aspect further comprises the step of storing the established image data in storage means.

More preferably, the image processing method according to the fifth aspect further comprises the step of saving the synthesized image and information indicative of a storage location in the storage means where the selected image data from which the synthesized image data is created is stored.

To attain the above object, in a sixth aspect of the present invention, there is provided an image processing method comprising the steps of inputting in real time an image of an object obtained by photographing the object, as digital image data, establishing the image data input in real time, storing the established image data in storage means, selecting one of the image data stored in the storage means, displaying the selected stored image data on a display screen, designating at least one area in the selected stored image data displayed on the display screen, creating a synthesized image by inserting the image data that has been input in real time and established into the designated area located in the selected image data displayed on the display screen, and displaying the created synthesized image.

Preferably, the area is designated by means of handwriting input.

To attain the above object, in a seventh aspect of the present invention, there is provided an image processing method comprising the steps of inputting an image of an object obtained by photographing the object, as digital image data, establishing the image data input in real time, storing the established image data in storage means, selecting one of the image data stored in the storage means, displaying the selected stored image data on a display screen, designating at least one position in the selected stored image data displayed on the display screen, generating a predetermined area including the designated position, on part of the display screen, and creating a synthesized image by inserting the image data that has been input in real time and established into the generated predetermined area located in the selected image data displayed on the display screen, and displaying the created synthesized image.

To attain the above object, in an eighth aspect of the present invention, there is provided an image processing method comprising the steps of inputting an image of an object obtained by photographing the object, as digital image data, establishing the image data input in real time, storing the established image data in storage means, selecting one of the image data stored in the storage means, displaying the selected stored image data on a display screen, designating at least one position in the selected stored image data displayed on the display screen, erasing image data of the selected image data displayed on the display screen located in at least one predetermined area including the designated position, creating a synthesized image by inserting the image data that has been input in real time and established into the predetermined area from which the image data has been erased, and displaying the created synthesized image.

To attain the above object, in a ninth aspect of the present invention, there is provided a readable storage medium that stores commands for causing a machine to execute an image processing method comprising the steps of inputting in real time an image of an object obtained by photographing the object, as digital object image data, creating frame image data comprising characters and/or graphics, designating at least one area of the created frame image where the input object image data is to be inserted, displaying the created frame image data and inserting the input object image data into the designated area of the displayed frame image, and displaying the designated area with the input object image data inserted therein, and establishing the inserted and displayed object image data.

To attain the above object, in a tenth aspect of the present invention, there is provided a readable storage medium that stores commands for causing a machine to execute an image processing method comprising the steps of inputting in real time an image of an object obtained by photographing the object, as digital image data, establishing the image data input in real time, storing the established image data in storage means, selecting one of the image data stored in the storage means, displaying the selected past stored image data on a display screen, designating at least one area in the selected stored data displayed on the display screen, creating a synthesized image by inserting the image data that has been input in real time and established into the designated area located in the selected image data displayed on the display screen, and displaying the created synthesized image.

To attain the above object, in an eleventh aspect of the present invention, there is provided a readable storage medium that stores commands for causing a machine to execute an image processing method comprising the steps of inputting an image of an object obtained by photographing the object, as digital image data, establishing the image data input in real time, storing the established image data in storage means, selecting one of the image data stored in the storage means, displaying the selected stored image data on a display screen, designating at least one position in the selected stored image data displayed on the display screen, generating a predetermined area including the designated position, on part of the display screen, and creating a synthesized image by inserting the image data that has been input in real time and established into the generated predetermined area located in the selected past image data displayed on the display screen, and displaying the created synthesized image.

To attain the above object, in a twelfth aspect of the present invention, there is provided a readable storage medium that stores commands for causing a machine to execute an image processing method comprising the steps of inputting an image of an object obtained by photographing the object, as digital image data, establishing the image data input in real time, storing the established image data in storage means, selecting one of the image data stored in the storage means, displaying the selected past stored image data on a display screen, designating at least one position in the selected stored image data displayed on the display screen, erasing image data of the selected image data displayed on the display screen located in at least one predetermined area including the designated position, creating a synthesized image by inserting the image data that has been input in real time and established into the predetermined area from which the image data has been erased, and displaying the created synthesized image.

The above and other objects, features and advantages of the present invention will become more apparent from the following detailed description taken in conjunction with the accompanying drawings.

DESCRIPTION OF THE PREFERRED EMBODIMENTS

The present invention will be described below with reference to drawings showing preferred embodiments thereof.

Figure 1:
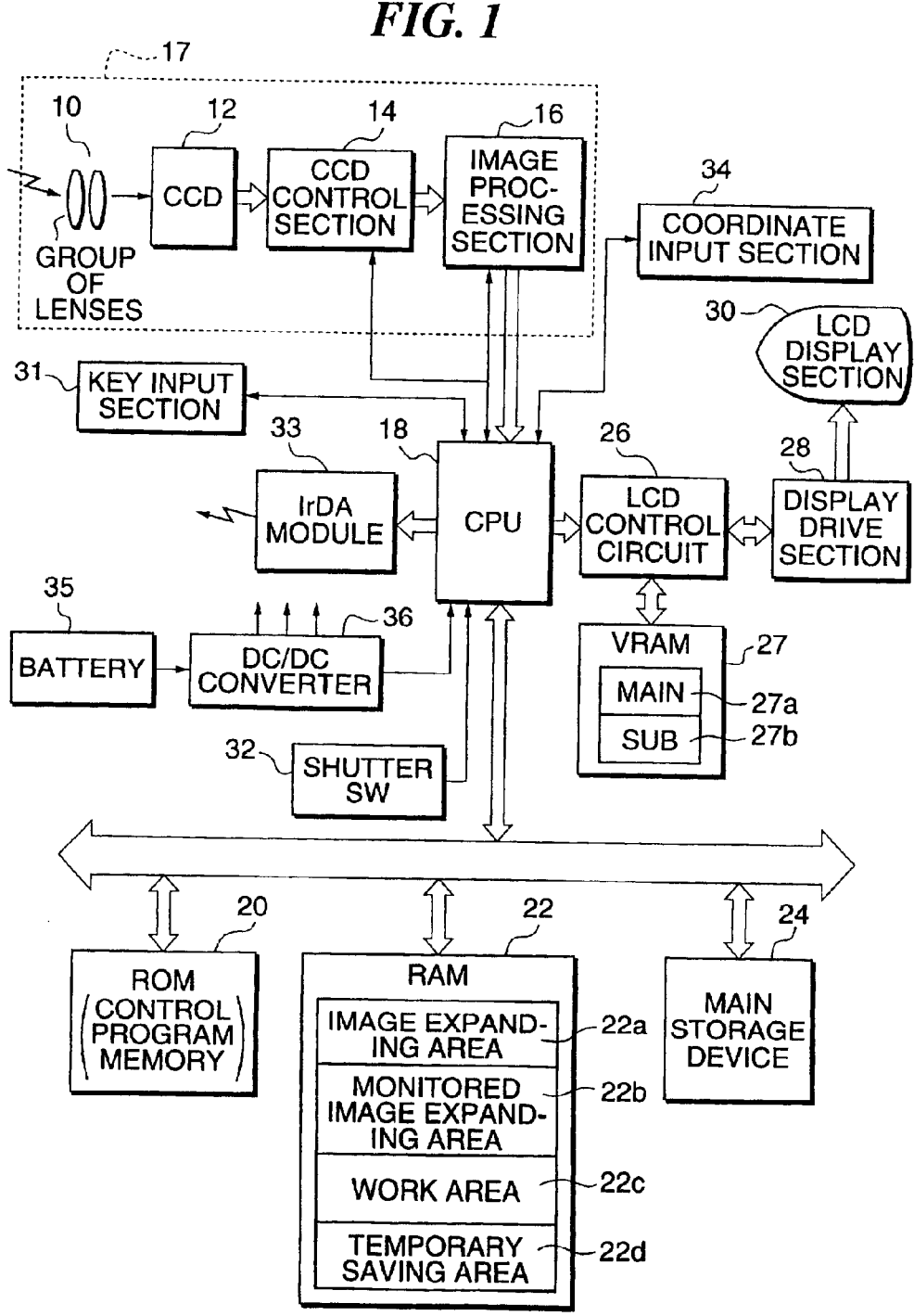
FIG. 1 is a block diagram schematically showing the construction of an image processing apparatus according to an embodiment of the present invention.
Figure 11:
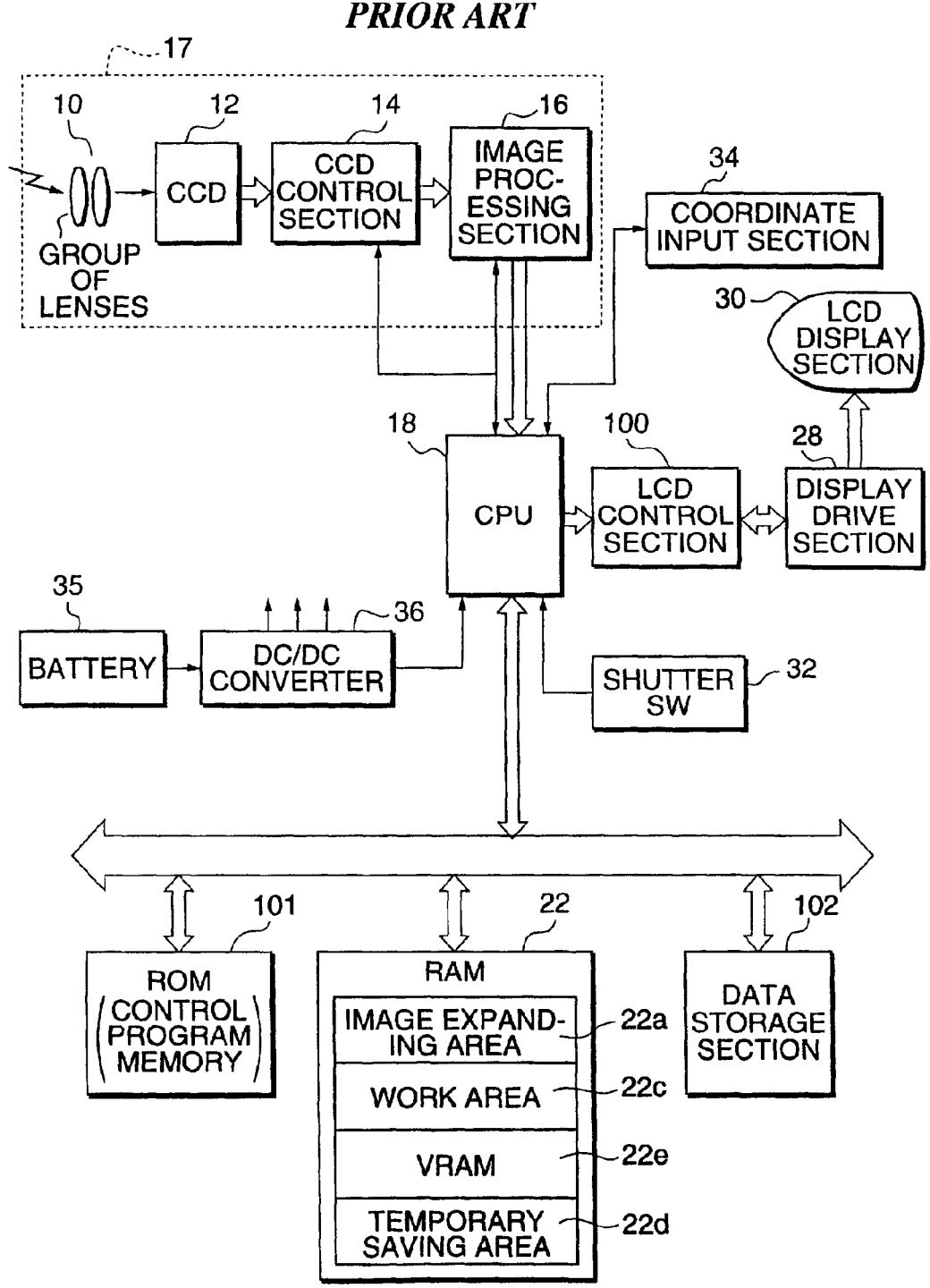
FIG. 11 is a block diagram schematically showing the construction of a conventional digital camera with a handwriting input section.

FIG. 1 is a block diagram schematically showing the construction of an image processing apparatus according to an embodiment of the present invention. Components identical or similar to those of the construction described with reference to FIG. 11 are denoted by the same reference numerals.

In FIG. 1, reference numeral 10 denotes an image pickup lens, 12 an image pickup element of a VGA size (640×480) or larger which is represented by a CCD, and 14 an image pickup element control circuit (CCD control section) comprised of a CDS/AGC circuit for supplying a transfer clock and a shutter signal to the image pickup element 12 while executing a noise removing process and a gain control process on an image signal from the image pickup element 12, an A/D converter for converting the analog image signal into, for example, a 10-bit digital signal, and others. This circuit always outputs image data for 30 screens (frames) per second.

Reference numeral 16 denotes an image processing circuit (image processing section) for executing image processing such as white balance adjustment and exposure control on image data from the image pickup element control circuit 14 to convert the data into a digital signal of the Y, Cb and Cr format and output the same. In the present embodiment, the image pickup lens 10, the image pickup element 12, the image pickup element control circuit 14, and the image processing circuit constitute a section called "camera module 17".

Reference numeral 18 denotes a CPU that controls the entire apparatus and executes image compressing and expanding processes, 20 a ROM that stores a control program and related data, 22 a RAM comprised of an image data expanding area 22a, a monitored image expanding area 22b, a work area 22c, and a temporary save area (normally called "stack area") 22d, 24 a main storage device such as a compact flash card or a smart media which is an image data saving area that stores all captured image information, and 26 an LCD control circuit for controlling a display driving circuit (display driving section) to display a desired image on an LCD display device (LCD display section). Further, reference numeral 27 denotes a VRAM that is a RAM area controlled by the LCD control circuit 26 and comprised of a main display image data area 27a and a sub display image data area 27b, 28 the display driving circuit for driving the LCD display device 30, 30 the LCD display device acting as a view finder, 31 a key input section for allowing an operator to execute various settings for the present apparatus, 32 a shutter switch (SW), 33 an IrDA module for executing infrared communication with an external apparatus (mainly a PC), 34 a coordinate input section arranged on the LCD display section for transferring coordinate data when depressed with a pen or the operator's fingertip, 35 a power supply composed of an AA battery or a Ni-Cd battery, and 36 a DC/DC converter circuit for converting power supplied from the power supply 34 into a voltage required by various devices.

The ROM 20, the RAM 22, the main storage device 24, the image processing circuit 16, the LCD control circuit 26, the shutter switch 32, the IrDA module 33, and the coordinate input section 34 are connected to the CPU 18 via data buses and address buses, as well as via control signals composed of a chip select signal, and read/write signals.

The CPU 18 executes various control operations based on the control program in the ROM 20. These control operations include a process of DMA (direct memory access)-transferring captured image data output from the image processing circuit 16, to the RAM 22, a process of DMA-transferring the data from the RAM 22 to the LCD control circuit 26, a process of JPEG-compressing the image data to store them in the main storage device 24 in a predetermined file format, a process of commanding a photographing operation mode operation in response to operation of the shutter switch 32, and other processes.

The image data expanding area 22a of the RAM 22 is used as a temporary buffer that temporarily stores a captured image (Y, Cb and Cr) data from the image processing circuit 16 and JPEG-compressed image data read out from the main storage device 24, and also used as an exclusive image work area for the image compressing and expanding processes.

The main storage device 24 is a memory that stores captured image data after the JPEG compression by the CPU 18, additional data such as information on folders which are referred to by an application or applications, and other data, in a predetermined file format. After photographing, to save a VGA image, the CPU 18 JPEG-compresses the captured image data and saves the photographing date and time in a designated folder in the main storage device 24, while creating, JPEG-compressing, and saving a thumbnail image.

When a reproduction mode is selected, the CPU 18 lists thumbnail images from image data contained in the folder in the main storage device 24, reads from the main storage device 24 VGA image data corresponding to one of the thumbnail images which has been selected, and then executes the JPEG expanding process on the read VGA image data. The CPU 18 then expands the data on the image data expanding area 22a, subjects the expanded data to various processes according to a desired display state, and then causes the LCD display section 30 to display the thus processed data.

The main storage section 24 is formed of a CF card, a smart media, an ATA flash card, or the like which is a storage medium that is removable from the apparatus main body. By removing the main storage device 24 from the apparatus main body and reading data therefrom using a reader such as a PC card reader of a personal computer, all of the folder structures can be seen on a monitor of the computer.

The LCD control circuit 26 receives Y, Cb and Cr image data output from the image processing section 16 and expanded on the image data expanding area 22a or Y, Cb and Cr image data output from the main storage device 24, JPEG-expanded and expanded on the image data expanding area 22a, RGB-converts the received data, and then writes the data onto a main display image data area 27a or a sub display image area 27b of the VRAM 27. In response to a command from the CPU 18, an image from one of these two areas is selected for display and the RGB image data on the area are supplied to the display driving circuit 28.

The display driving circuit 28 drives the LCD image display device 30 in accordance with the RGB image data from the LCD control circuit 26. In the present embodiment, the LCD image display device 30 is comprised of a TFT liquid crystal display panel having a VGA video mode such as 640×480 pixels.

The shutter switch 32 is used to command the photographing operation mode operation to be started and can assume two positions, i.e. a semi-depressed state and a fully depressed state as is well known from a still camera. In the semi-depressed state, the CPU 18 locks white balance and exposure control parameters, and subsequently, if it determines that the shutter 32 has been fully depressed, JPEG-compresses the captured image expanded on the image data expanding area 22a and loads the image into the main storage device 24.

Figure 2:
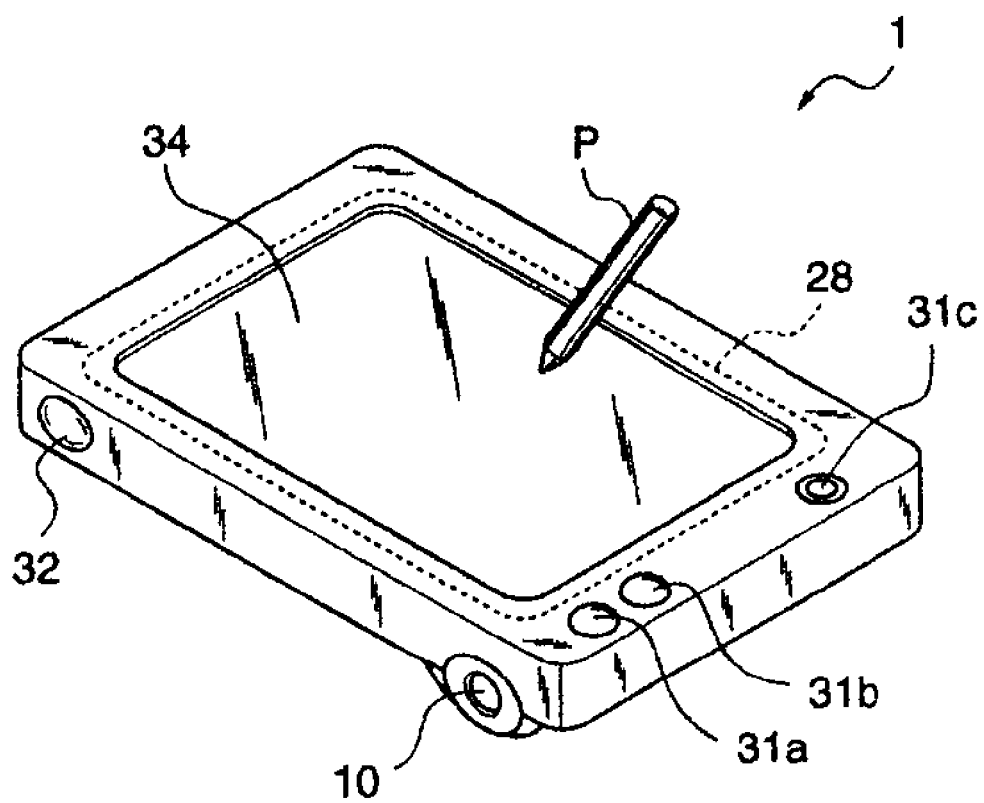
FIG. 2 is a perspective view the image processing apparatus shown in FIG. 1.
Figure 3:
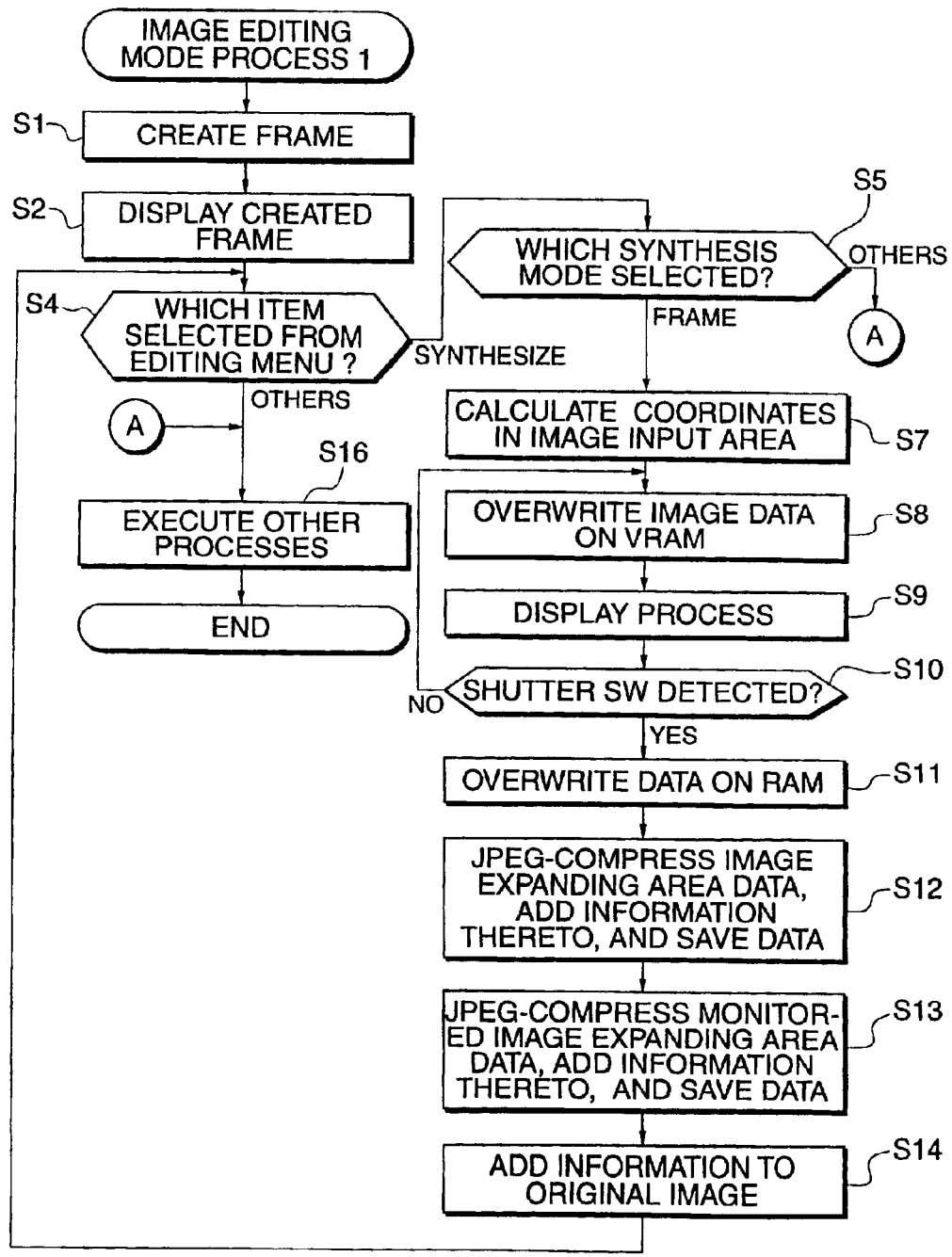
FIG. 3 is a flow chart showing a procedure of an image editing mode process 1.
Figure 4:
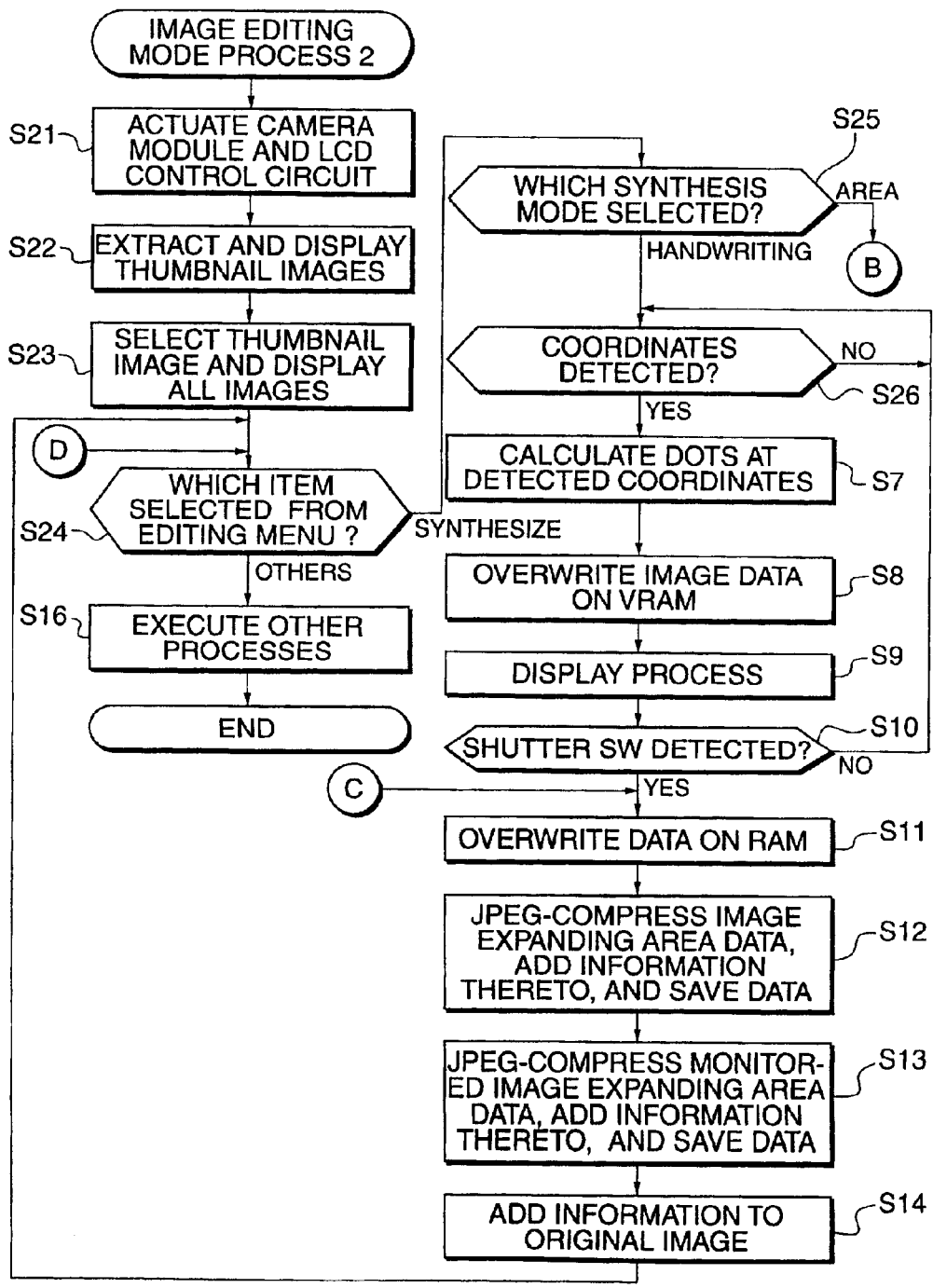
FIG. 4 is a flow chart showing a procedure of an image editing mode process 2.
Figure 5:
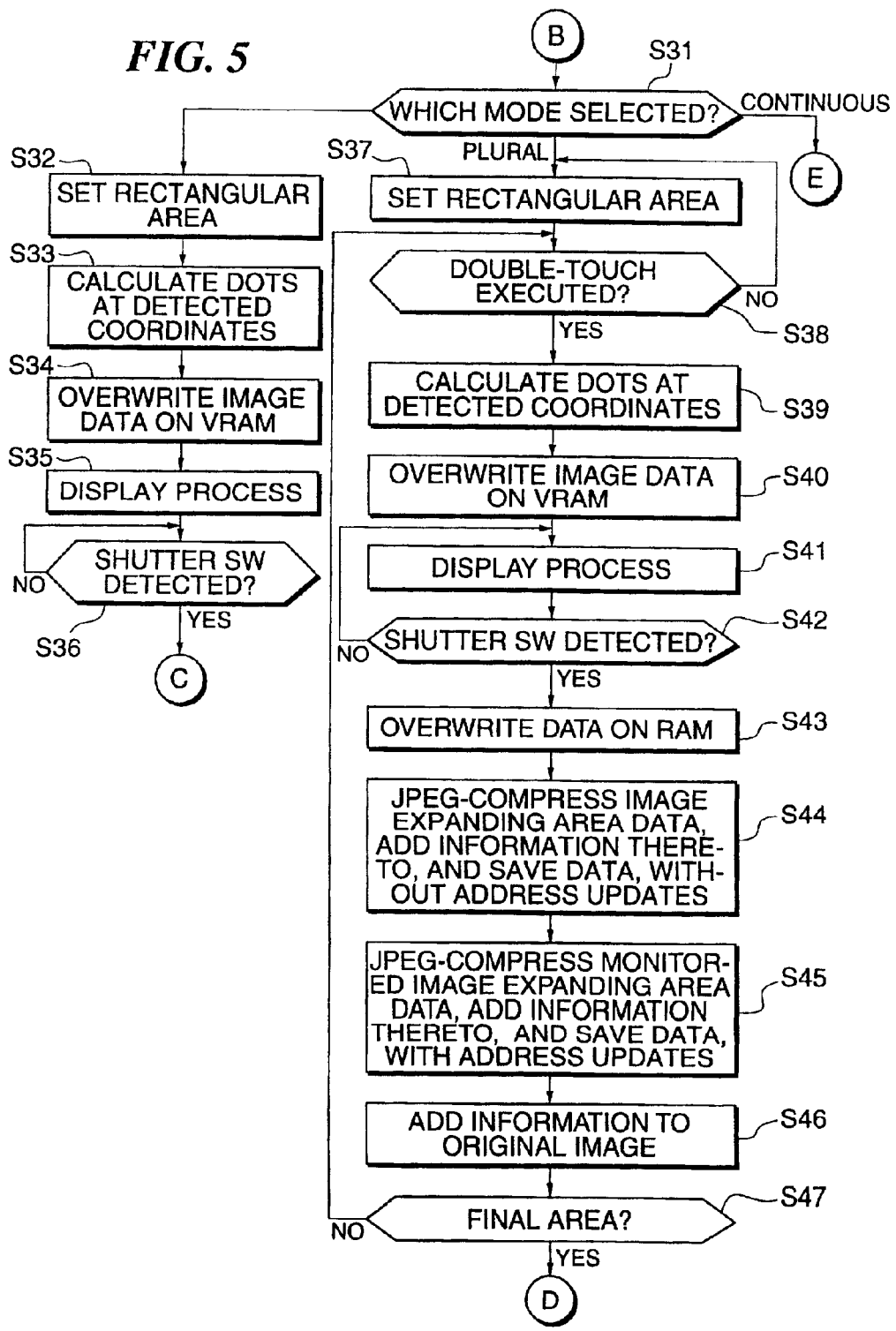
FIG. 5 is a flow chart showing a continued part of the procedure of FIG. 4.
Figure 6:
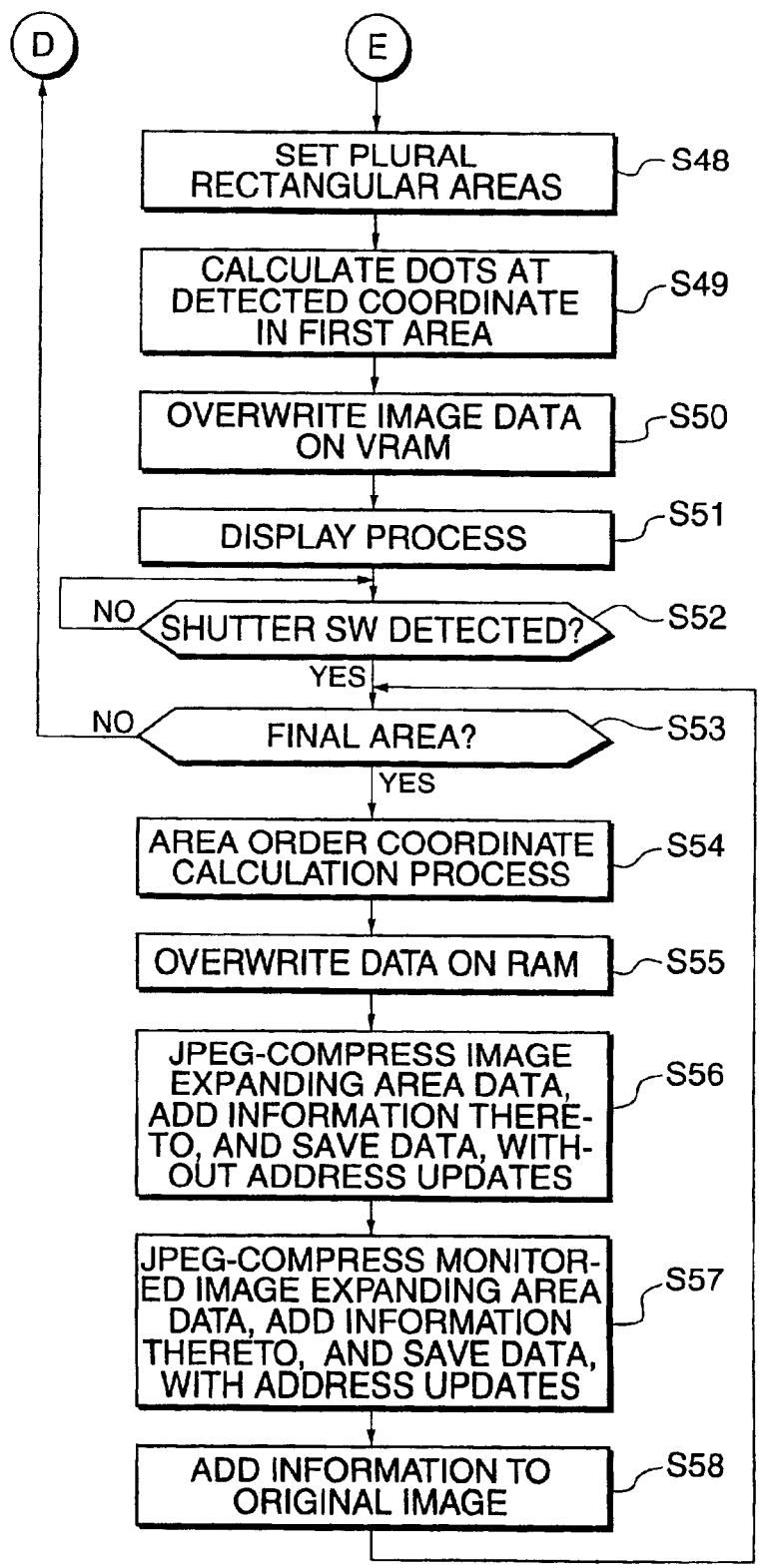
FIG. 6 is a flow chart showing a continued part of the procedure of FIG. 5.

FIG. 2 is a perspective view of the image processing apparatus 1 according to the present embodiment.

In the figure, symbol P denotes a pen as an input means for inputting characters or designating positions, and reference numerals 31a to 31c denote key switches including an ON/OFF key, and a cursor key, managed by the key input section 31 in FIG. 1.

Next, control processes executed by the image processing apparatus constructed as described above will be described with reference to FIGS. 3 through 7A to 7G.

First, an example of a control process executed if the operator creates an original frame and synthesizes a captured image within the created frame will be described with reference to FIGS. 3 through 7A to 7G.

When the power is turned on and a "Create Frame" button 30b is selected from an image editing menu 30a (see FIG. 7A), the CPU 18 executes a frame creating guidance on the image data expanding area 22a and the main image display area 27a based on a predetermined process (step S1). That is, as shown, for example, in FIG. 7B, a frame background color is first selected, a character input area A1 and an image input area A2 are then designated, and finally a name is allotted to the frame and saved. The frame data is thus fetched from the image expanding area 22 and saved in the main storage device 24 to complete the frame creating operation. To reduce load on the CPU 18, the number of pixels in the image input area A2 is selected from predetermined values including 320×240 equal to one-fourth of the number of displayed pixels, that is, 640×480, and 80×60 equal to one-eighth of the same.

Figure 7A:
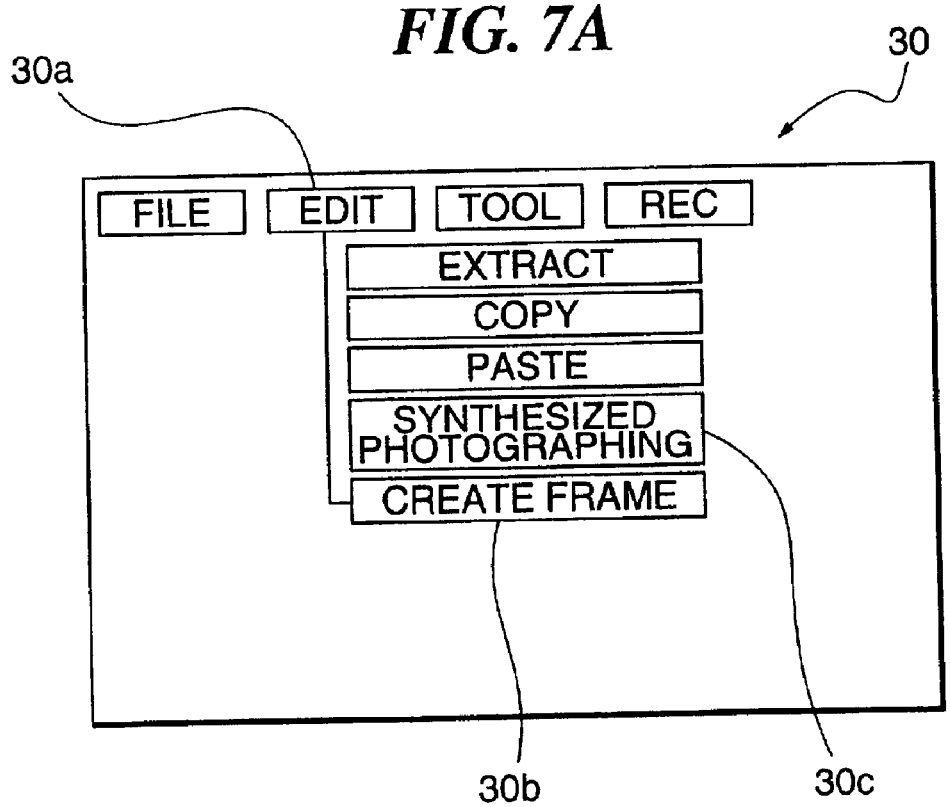
FIGS. 7A to 7G are views showing an example of a display on an LCD display section appearing in FIG. 1.
Figure 7B:
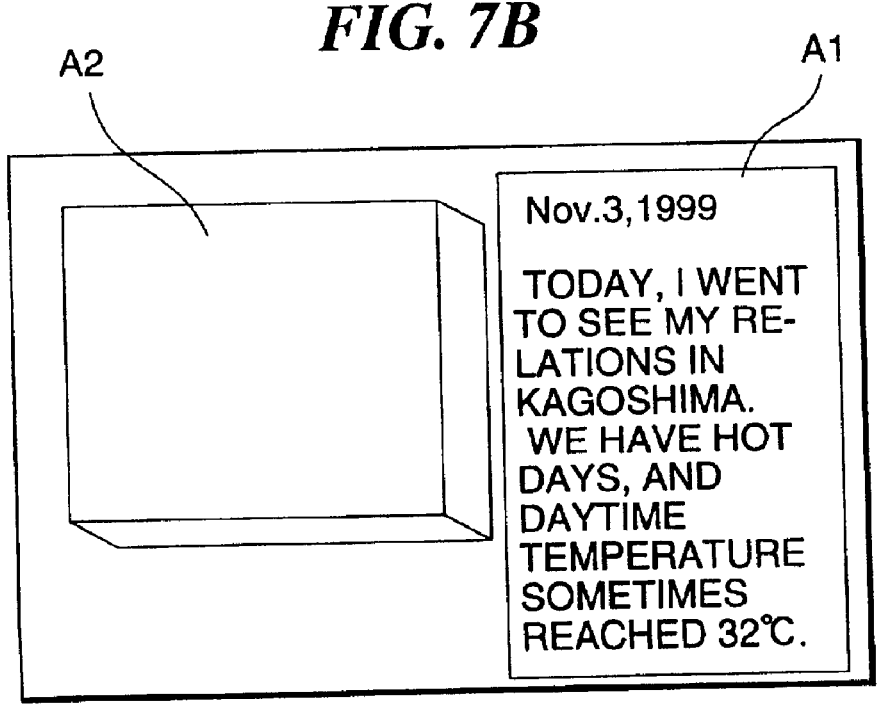

With the frame image in FIG. 7B displayed (step S2), a "Synthesized Photographing" button 30c is selected from the editing menu 30a (step S4 to step S5), and a "Synthesize Image" button 30d is selected (step S5 to step S7). In response to the selections, the CPU 18 calculates coordinates in the image input area A2 (step S7), and then expands image data output from the camera module 17, on the monitored image expanding area 22b (step S8). Further, the CPU 18 decimates the expanded image data to a number of pixels (80×60 or 320×240) corresponding to that of the designated image input area A2, and transfers the decimated data to the LCD control circuit 26. The CPU 18 then causes the LCD control circuit 26 to write, after RGB conversion, the data over frame image data expanded on an image input area of the main display image data area 27a, whereby the monitored image can be displayed in the image input area A2 (step S9).

Figure 7C:
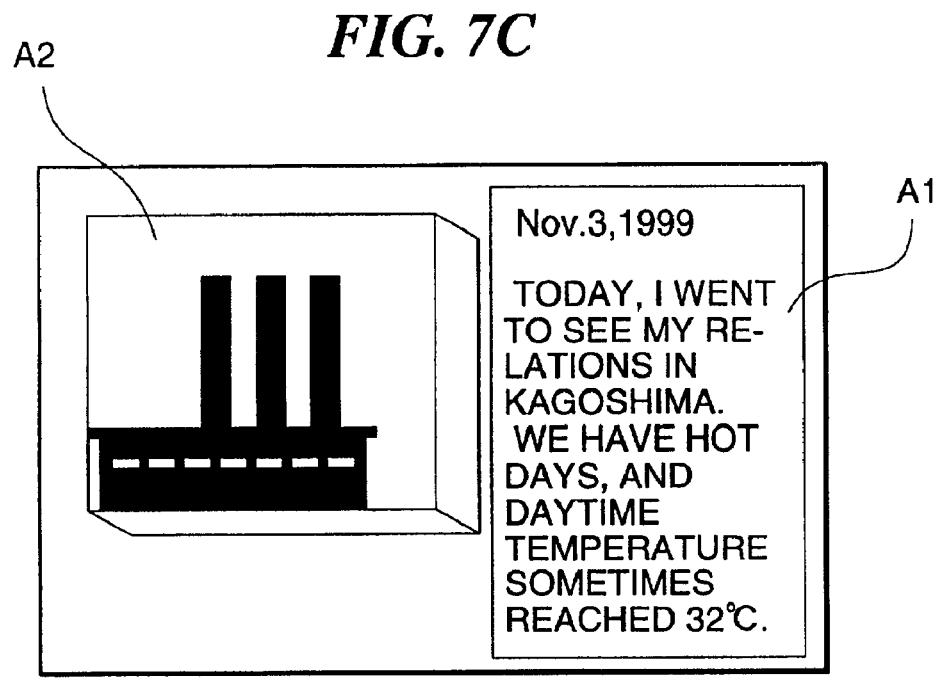

When the operator performs desired operations such as zooming and exposure correction and then fully depresses the shutter SW 32 once a desired monitored image is obtained as shown in FIG. 7C (step S10), the CPU 18 decimates the image data in the monitored image expanding area 22b in the same manner as during the monitoring, writes the decimated data over a portion of data corresponding to the image input area A2 over the image data expanding area 22a (step S11), JPEG-compresses the overwritten data on the image data expanding area 22a, and adds a new desired file name, information indicating what frame image the data is synthesized with the image data, and coordinate information on all coordinates of the synthesized portion, to the compressed data, which are then saved in the main storage device 24 (steps S12 and S13). The CPU 18 also adds relevant information indicating original frame image data to the frame image data read out from the main storage device 24, with which the image data has been synthesized (step S14)

Next, a procedure of synthesis of a new image with a past captured image will be explained with reference to FIGS. 4 to 7.

When the power is turned on and the "Synthesized Photographing" button 30c is selected from the image editing menu 30a (see FIG. 7A), the CPU 18 actuates the camera module 17 and the LCD control circuit 26, expands image data output from the camera module 17, onto the monitor image expanding area 22b, extracts data corresponding to an effective number of pixels (640×480 dots) of the LCD display device 30, from the expanded data, and transfers the extracted data to the sub display image data area 27b after RGB conversion (step S21).

Figure 7D:
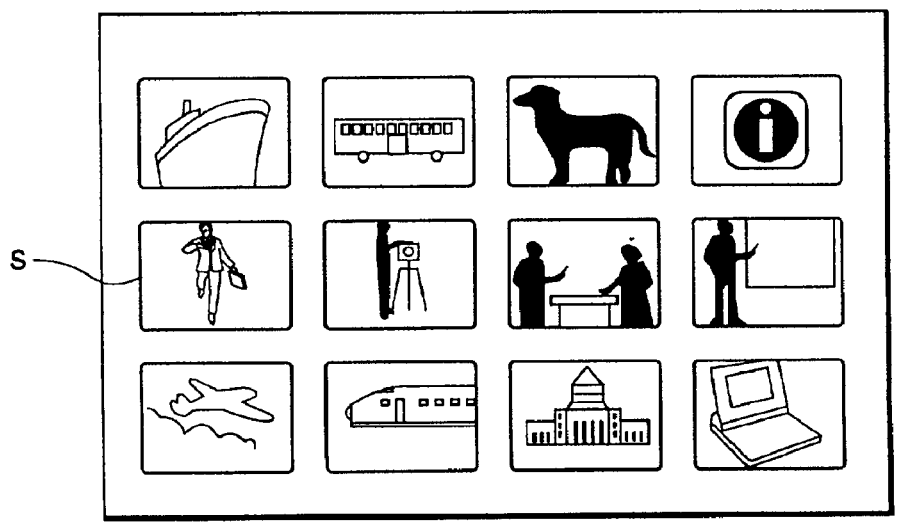
Figure 7E:
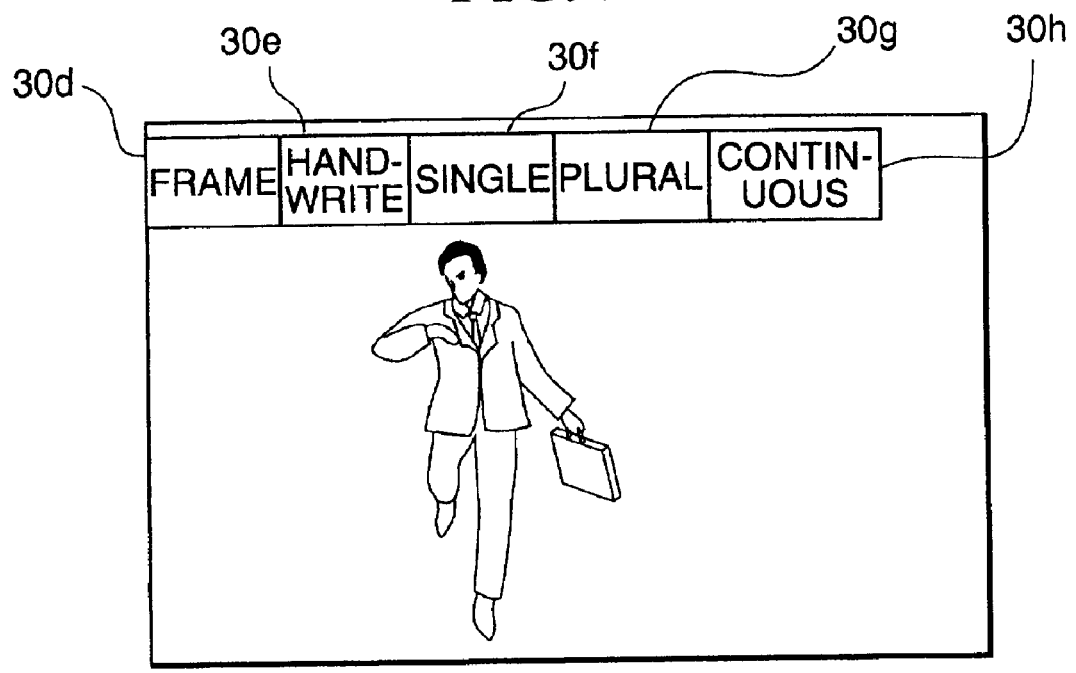

Next, the CPU 18 transfers all thumbnail images saved in the folder in the main storage device 24 to the main display image data area 27a after RGB conversion to display them in a list on the LCD display section 30 as shown in FIG. 7D (step S22). When the operator selects one of the images that is desired to be synthesized (for example, a thumbnail image s), the CPU 18 reads the image data from the storage device 24, expands them on the image data expanding area 22a, extracts data corresponding to the effective number of pixels (640×480 dots) from the expanded data, and then transfers the extracted data to the main display image area 27a. Accordingly, the image is displayed over the entire screen of the LCD display section 30 as shown in FIG. 7E (step S9).

Figure 7F:
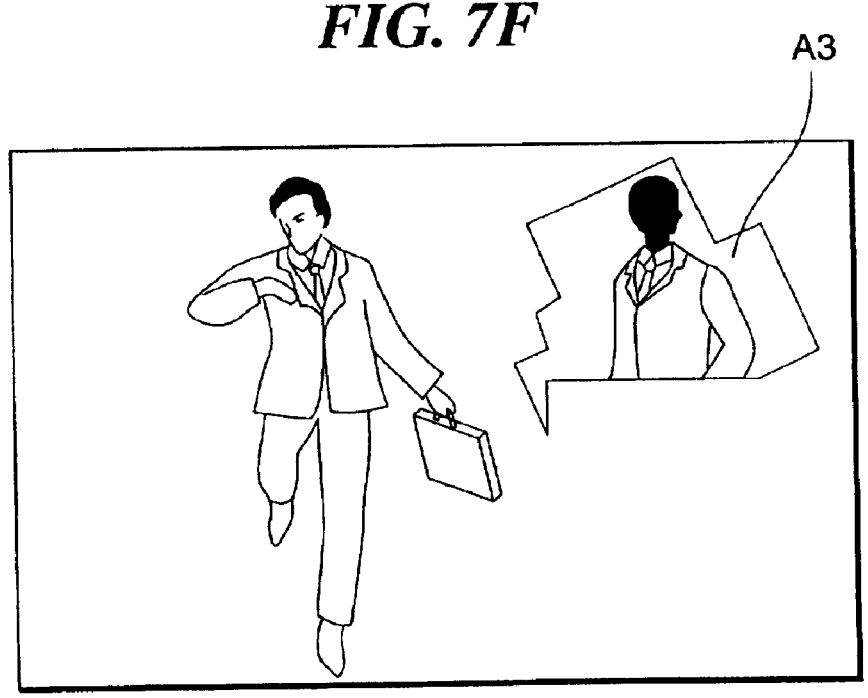

When the operator selects a "Handwriting" button 30e from the displayed editing menu (step S25) and touches a desired portion of the displayed image with the pen P (draws a closed area with the pen) (step S26), the CPU 18 determines coordinate data on the touched portion transmitted from the coordinate input section 34 (step S27), transfers image data on dots on the sub display image data area 27b which correspond to the coordinates, to the main display image data area 27a to write the image data over the data on the area 72a (step S8). Thus, part of the monitored image is displayed only in a portion A3 touched with the pen as shown in FIG. 7F (step S9).

When the operator performs desired operations such as zooming and exposure correction and then depresses the shutter SW 32 once a desired monitored image is obtained (step S10), the CPU 18 writes over the image data expanding area 22a image data on the monitored image expanding area 22b corresponding to all coordinates to be replaced (step S11), JPEG-compresses the data written over the image data expanding area 22a and the data on the monitored image expanding area 22b, and adds a new desired file name, information indicating what frame image the data is synthesized with the image data, and coordinate information on all coordinates of the synthesized portion, to the compressed data, which are then saved in the main storage device 24 (steps S12 and S13). The CPU 18 also adds indicating original image data to the frame image data read out from the main storage device 24, with which the image data has been synthesized (step S14).

Figure 7G:
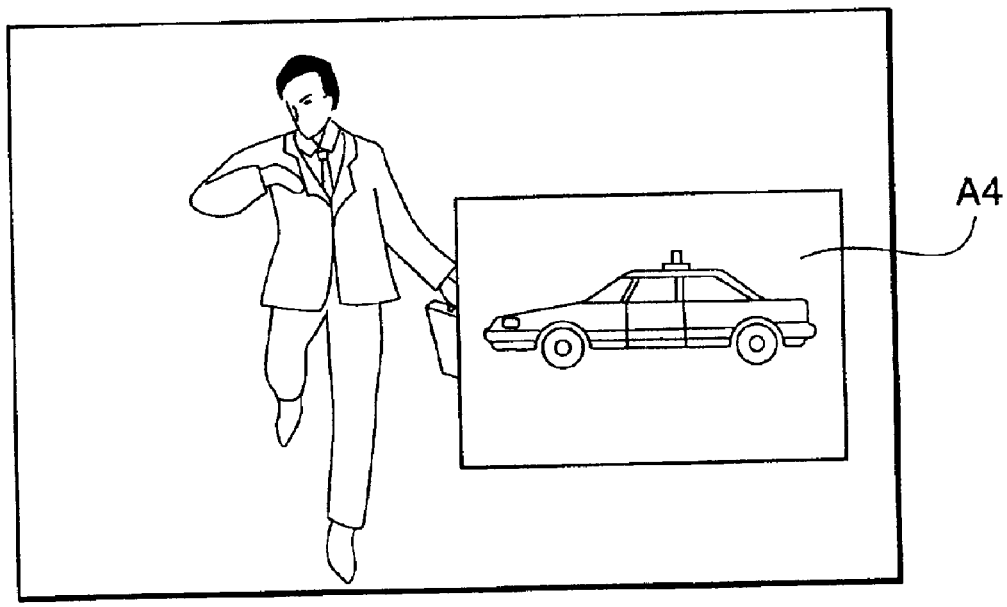

When the operator selects a "Single" button 30f from the displayed editing menu (step S31) and touches a desired portion of the displayed image with the pen P, a portion of image data on the sub display image data area 27b corresponding to a rectangular area (or a circular area or an area of any other arbitrary shape and corresponding to, for example, about 80×60 pixels) of an arbitrary size is formed using the touched portion as a start point (step S33), and are transferred to the main display image data area 27a and written thereon (step S34), so that only the data in the formed area are displayed for monitoring as shown in FIG. 7G (step S35). The operator can move the formed area to any desired position and set the size of the same to any desired size by touching a lower left portion or the right or bottom side of the rectangular area with the pen. If the shutter SW 32 is depressed, a process similar to that for the "handwriting" operation is executed.

If the operator selects a "Plural" button 30g and performs a pen touch operation in the same manner as with the "Single" button 30f, a new rectangular area is generated, but at this point, image transfer from the sub display image data area 27 be is not carried out and the rectangular area is blank. In this regard, to blank a certain display area, Y data and Cb/Cr data in the main display image data area 27a corresponding to this area may be set, for example, to 0ffh and 80h, respectively.

When the operator completes designating the size of the rectangular area and touches another display area, a new rectangular area is displayed again. This operation is repeated to generate a desired number of rectangular areas on the LCD display section 30.

When the operator subsequently double-touches one of the rectangular areas that is desired to be displayed for monitoring, with the pen, the CPU 18 transfers only image data in the display image area 27b corresponding to the touched rectangular area, to the main display image data area 27a to overwrite the area 27a so that the touched rectangular area alone is displayed for monitoring. If the monitoring is to be switched to another rectangular area, the currently displayed rectangular area may be double-touched to switch the image data to be transferred.

Once a desired monitored image is obtained, when the shutter SW 32 is depressed, the monitored image is displayed in the selected rectangular area and for the other rectangular areas, blank images are created on the image data expanding area 22a and saved as is the case with the "handwriting" operation. To create a blank image on the image expanding area, the corresponding Y and Cb/Cr data may also be set to 0ffh and 80h, respectively.

Once the first photographing operation mode operation is completed, the captured image is inserted into the first selected rectangular area, whereas the other rectangular areas remain displayed as blank images. When the operator double-touches the next rectangular area desired to be synthesized with the image, the monitored image is displayed in this rectangular area.

The photographing and area selecting operations are subsequently repeated to record a final image consisting of images embedded in all the rectangular areas in the main storage device 24. Each time the photographing operation mode operation is carried out, the image in the monitored image expanding area 22b is JPEG-compressed and recorded (step S45), a synthesized image is created in a fashion overwriting a synthesized image created during the last photographing operation mode operation (step S44), and only the history of the synthesis remains as additional information (finally, only one synthesized image and a number of monitored images corresponding to the number of performed photographing operation mode operations are recorded). Historical information on all captured images is added to the first selected image (step S46).

If the operator selects a "Continuous" button 30h, a desired number of rectangular areas are created in the same manner as the case with the "Plural" button 30g (step S48), but the order of creation of the rectangular areas determines the order in which the monitored images are synthesized with the rectangular areas (step S49), and a single operation of the shutter SW 32 causes the images to be automatically continuously synthesized. Also in this case, only one synthesized image and a number of monitored images corresponding to the number of performed photographing operation mode operations are recorded in the main storage device 24.

In this manner, according to the present embodiment, a desired image can be inserted into a desired portion of a desired created frame image or of a desired previously captured image in real time to enable an operator to synthesize the images with a simple operation without using a personal computer. Further, since information indicative of the monitored image is added to each image before and after the synthesis, if any image is desired to be modified later, then relevant images can be easily retrieved based on this information.

In the present embodiment, all the image data output from the camera module 17 at a rate of 30 frames per second are expanded on the monitored image expanding area 22b, but if the capacity of the RAM 22 is limited and the CPU 18 operates faster, the image synthesis can be achieved without using the monitored image expanding area 22b.

Figure 8:
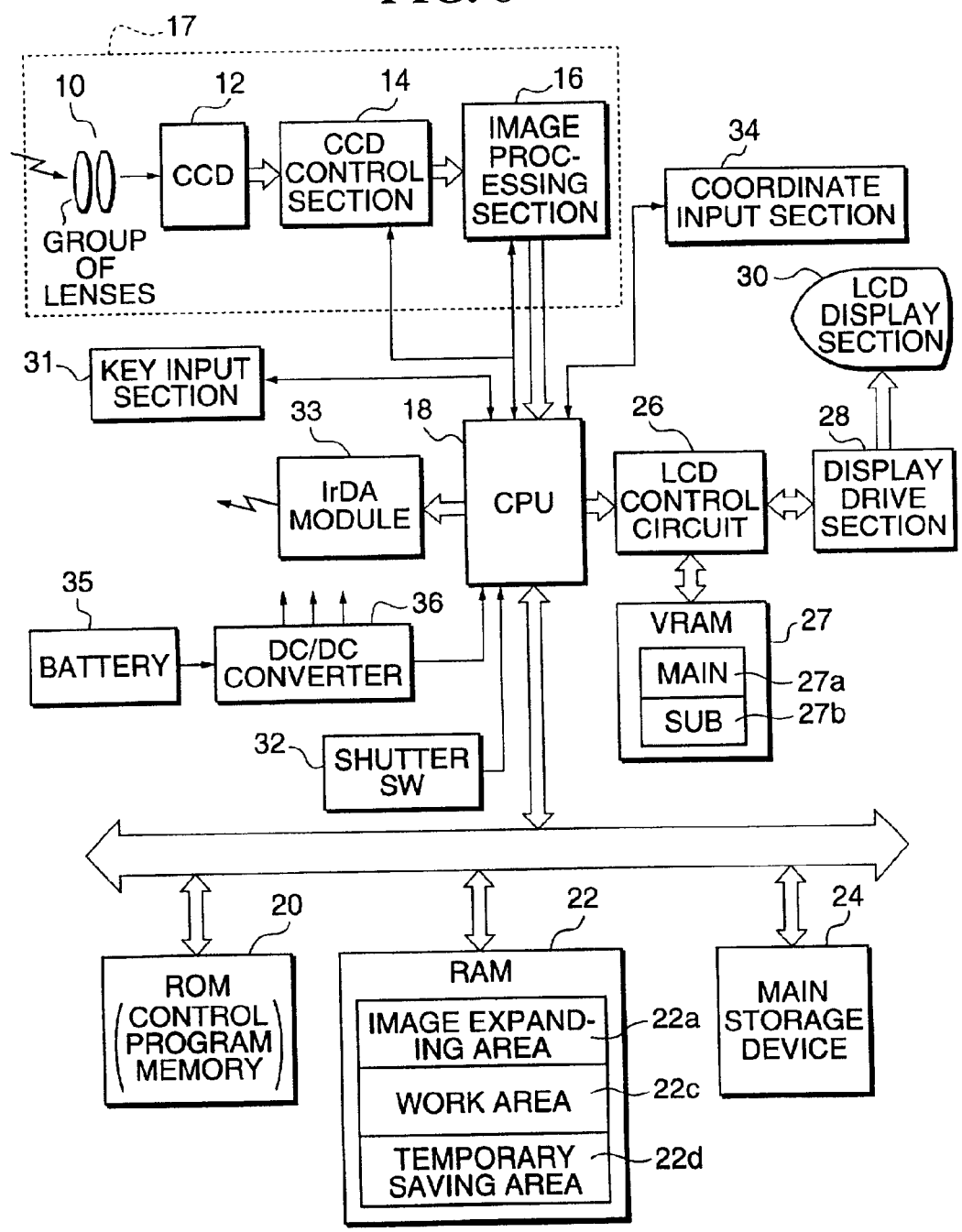
FIG. 8 is a block diagram schematically showing the construction of an image processing apparatus according to another embodiment of the present invention.

FIG. 8 is a block diagram schematically showing the configuration of an image processing apparatus which can perform the image synthesis without using the monitored image expanding area 22b.

In the image processing apparatus of FIG. 8, instead of transferring the image data output from the camera module 17 to the RAM 22, the CPU 18 carries out a software-based process to decimate an amount of display image data corresponding to VGA pixels in real time and transfers the decimated data to the sub display image data area 27b via the LCD control circuit 26. During the photographing operation mode, only area image data to be synthesized are extracted from the image data output from the camera module 17 and are written directly onto the image data expanding area 22a.

Thus, the image processing apparatus shown in FIG. 8 uses the method of extracting only the area image data from the image data output from the camera module 17 and directly writing the extracted data onto the image data expanding area 22a. If the capacity of the RAM 22 is limited and the CPU 18 operates faster, however, the image synthesis can be achieved using only a capacity of this VRAM area corresponding to one screen.

Figure 9:
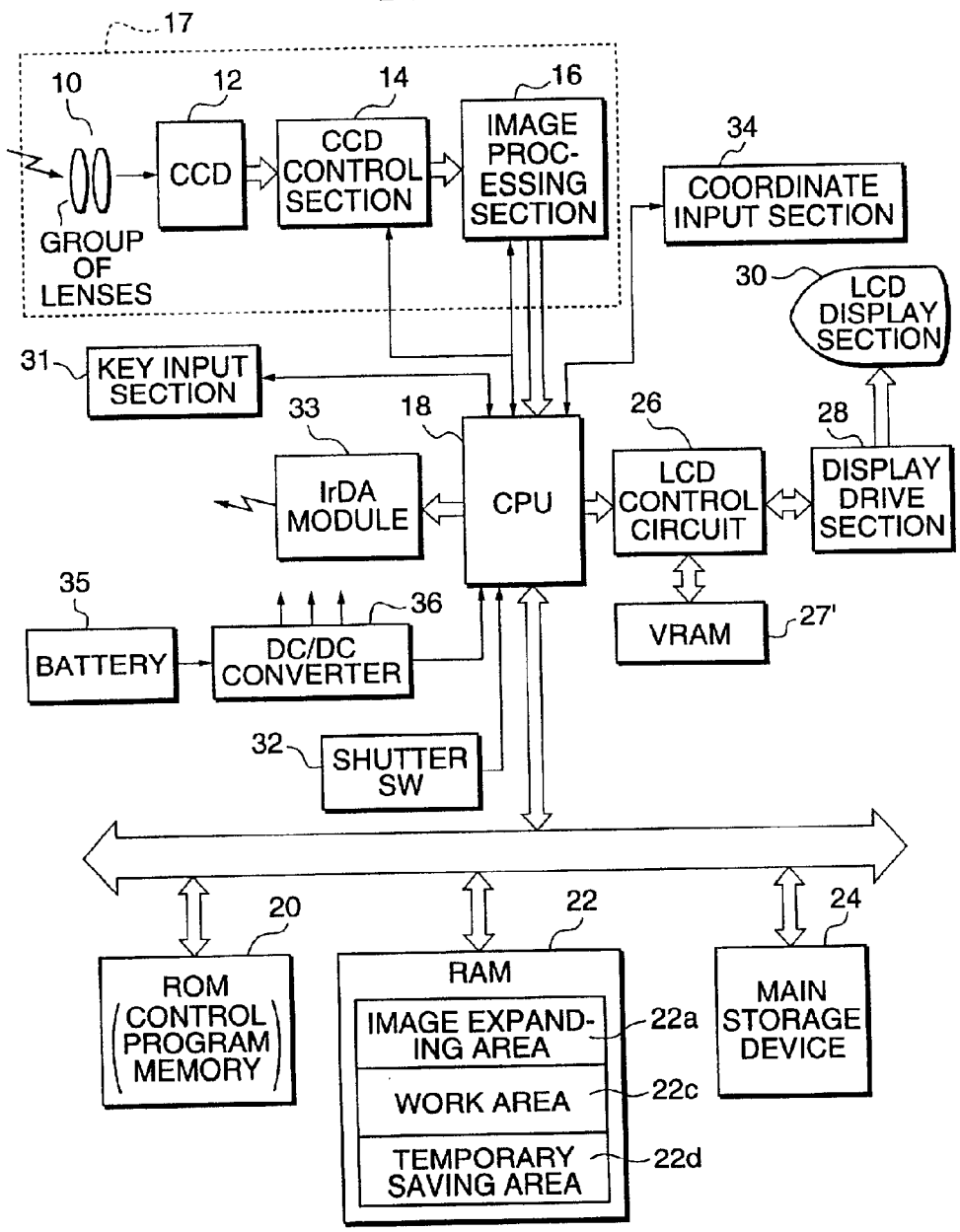
FIG. 9 is a block diagram schematically showing the construction of an image processing apparatus according to still another embodiment of the present invention.

FIG. 9 is a block diagram schematically showing the configuration of an image processing apparatus which can perform the image synthesis using only a capacity of this VRAM area corresponding to one screen.

In the image processing apparatus of FIG. 9, instead of transferring the image data output from the camera module 17 to the RAM 22, the CPU 18 carries out a software-based process to decimate an amount of display image data corresponding to VGA pixels in real time, executes coordinate calculations, and then transfers only image data on required dots directly to a VRAM 27'. Thus, only a portion touched with the pen or a selected rectangular area appears to be monitored. During the photographing operation mode, only area image data to be synthesized are extracted from the image data output from the camera module 17 and are written directly onto the image data expanding area 22a, as is the case with the image processing apparatus shown in FIG. 8.

In the present embodiment, as the means for selecting a past image, thumbnail images are displayed in a list and the operator is instructed to select one of them, as stated above. If an image that has just been captured is desired to be synthesized, however, a complicated procedure is required. This problem can be solved by adding a function of reading all images to allow the operator to readily select an image to be synthesized from the read out images if the just captured image is to be synthesized.

Figure 10:
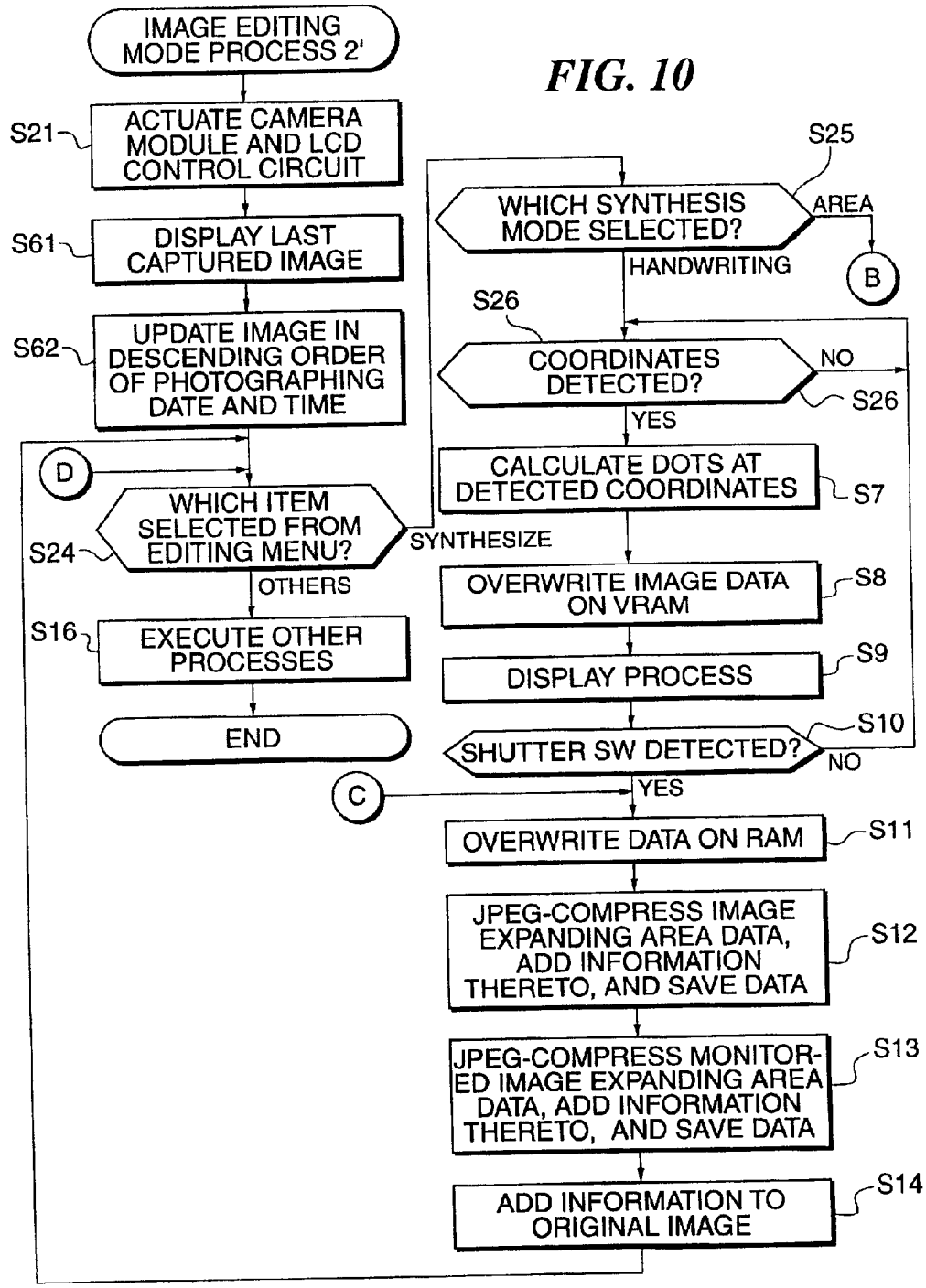
FIG. 10 is a flow chart showing a procedure of an image editing mode process 2'.

FIG. 10 is a flow chart showing part of a control process executed by an image processing apparatus which can perform the above-mentioned function of reading all captured images and allow the operator to readily select an image to be synthesized from the read out images if the just captured image is to be synthesized.

In FIG. 10, if the camera is set to start display with a last captured image in an edition mode (step S61) similarly to many digital cameras that first display a last captured image when set to a reproduction mode, then it may be more convenient to retrieve images in the descending order of the date starting with the displayed last captured image using the cursor 31b or the like.

It goes without saying that the object of the present invention may be achieved by supplying a system or an apparatus with a storage medium in which the program code of software that realizes the function of the present embodiment is recorded, and causing a computer (or CPU or MPU) of the system or apparatus to read out and execute the program code stored in the storage medium.

In this case, the program code itself read out from the storage medium realizes the novel functions of the present invention, so that the storage medium storing the program code also constitutes the present invention.

The storage medium for supplying the program code may be selected from, for example, a floppy disk, hard disk, optical disk, magneto-optical disk, CD-ROM, CD-R, magnetic tape, non-volatile memory, and ROM. Further, the program code may be supplied from a server computer via a communication network.

It also goes without saying that the functions of the above described embodiments may be accomplished not only by executing a program code read out by a computer, but also by causing an operating system (OS) that operates on the computer to perform a part or the whole of the actual operations according to instructions of the program code.

Furthermore, it is to be understood that the program code read out from the storage medium may be written into a memory provided in an expanded board inserted in the computer, or an expanded unit connected to the computer, and a CPU or the like provided in the expanded board or expanded unit may actually perform a part or all of the operations according to the instructions of the program code, so as to accomplish the functions of the above described embodiments.

What is claimed is:

1. An image processing apparatus comprising:
   a storage unit that stores at least one digital image data;
   an input unit that inputs in real time an image of an object obtained by photographing the object, as digital image data;
   a display control unit that displays on a display screen the image data that is being input in real time;
   a selecting unit that selects one of the image data stored in said storage unit;
   a setting unit that sets a plurality of closed areas in the selected imaged data displayed on the display screen;
   a designating unit that designates one of the plurality of closed areas; and
   an image synthesizing unit that creates a synthesized image by inserting the image data that is being input in real time into the designated closed area located in the selected image data displayed on the display screen.

2. An image processing apparatus according to claim 1, wherein said setting unit sets the closed areas by means of handwriting input.

3. An image processing apparatus comprising:
   a storage unit that stores at least one digital image data;
   an input unit that inputs in real time an image of an object obtained by photographing the object, as digital image data;
   a buffer that temporarily stores the digital image data that is being input in real time;
   a display control unit that displays on a display screen the image data that is being input in real time and read from said buffer;
   a selecting unit that selects one of the image data stored in said storage unit;
   a display unit that displays the selected image data on the display screen when the stored image is selected by said selecting unit;
   a designating unit that designates at least one area in the selected image data displayed on the display screen; and
   an image synthesizing unit that creates a synthesized image by inserting the digital image data that is being input in real time and read from said buffer into the designated area located in the selected image data displayed on the display screen.

4. An image processing apparatus according to claim 3, further comprising a changing unit that changes a size of the predetermined area while the predetermined area is displayed on the display screen.

5. An image processing apparatus according to claim 3, further comprising a saving unit that saves the synthesized image and saves information indicative of a storage location in said storage unit where the selected image data from which the synthesized image data is created is stored.

6. An image processing apparatus comprising:
   a storage unit that stores at least one digital image data;
   an input unit that inputs in real time an image of an object obtained by photographing the object, as digital image data;
   a buffer that temporarily stores the digital image data that is being input in real time;
   a selecting unit that selects one of the image data stored in said storage unit;
   a display unit that displays the selected image data on a display screen;
   an area setting unit that sets at least one area in the selected image data displayed on the display screen;
   a data setting unit that sets a predetermined image data in the set area of the selected image data displayed on the display screen; and
   an image synthesizing unit that creates a synthesized image by inserting the digital image data that is being input in real time and read from said buffer into the set area in which the predetermined image data has been set, and displays the created synthesized image on the display screen.

7. An image processing apparatus according to claim 6, further comprising a second selecting unit operable, when said area setting unit sets a plurality of predetermined areas and said data setting unit sets predetermined image data into the plurality of predetermined areas, that selects one of the plurality of predetermined areas, and wherein said image synthesizing unit creates the synthesized image by inserting the image data that is being input in real time into the predetermined area selected by said second selecting unit, and e displays the created synthesized image on the display screen.

8. An image processing apparatus according to claim 6, further comprising a changing unit that changes a size of the selected area.

9. An image processing apparatus according to claim 6, further comprising a saving unit that saves the synthesized image and saves information indicative of a storage location in said storage unit where the selected image data from which the synthesized image data is created is stored.

10. An image processing method comprising the steps of:
    storing at least one digital image data in storage means;
    inputting in real time an image of an object obtained by photographing the object, as digital image data;
    displaying on a display screen the image data that is being input in real time;
    selecting one of the image data stored in the storage means;
    setting a plurality of closed areas in the selected image data displayed on the display screen;
    designating one of the set plurality of closed areas;
    creating a synthesized image by inserting the image data that is being input in real time into the designated closed area located in the selected image data.

11. An image processing method according to claim 10, wherein the closed areas are set by means of handwriting input.

12. An image processing method comprising the steps of:
    storing at least one digital image data in storage means;
    inputting in real time an image of an object obtained by photographing the object, as digital image data;
    storing temporarily the digital image data that is being input in real time in a buffer;
    displaying on a display screen the image data that is being input in real time and read from the buffer;
    selecting one of the image data stored in the storage means;
    displaying the selected image data on the display screen when the stored image is selected;
    designating at least one area in the selected image data displayed on the display screen; and creating a synthesized image by inserting the digital image data that is being input in real time and read from the buffer into the designated area located in the selected image data displayed on the display screen.

13. An image processing method according to claim 12, further comprising the step of changing a size of the predetermined area while the predetermined area is displayed on the display screen.

14. An image processing method according to claim 12, further comprising the step of saving the synthesized image and information indicative of a storage location in said storage means where the selected image data from which the synthesized image data is created is stored.

15. An image processing method comprising the steps of:
storing at least one digital image data in storage means;
inputting in real time an image of an object obtained by photographing the object, as digital image data;
storing temporarily the digital image data that is being input in real time in a buffer;
selecting one of the image data stored in the storage means;
displaying the selected image data on a display screen;
setting at least one area in the selected image data displayed on the display screen;
setting predetermined data in the setting area of the selected image data displayed on the display screen;
creating a synthesized image by inserting the digital image data that is being input in real time and read from said buffer into the set area in which the predetermined image data has been set; and
displaying the created synthesized image on the display screen.

16. An image processing method according to claim 15, further comprising the step of selecting one of a plurality of predetermined areas when the plurality of predetermined areas are set in said area setting step and predetermined image data are set into the plurality of predetermined areas in said data setting step, and wherein the synthesized image is created by inserting the image data that is being input in real time into the selected predetermined area; and the created synthesized image is displayed on the screen.

17. An image processing method according to claim 15, further comprising the step of changing a size of the selected area.

18. An image processing method according to claim 15, further comprising the step of saving the synthesized image and information indicative of a storage location in said storage means where the selected image data from which the synthesized image data is created is stored.

19. A readable storage medium that stores commands for causing a machine to execute an image processing method comprising the steps of:
storing at least one digital image data in storage means;
inputting in real time an image of an object obtained by photographing the object, as digital image data;
displaying on a display screen the image data that is being input in real time;
selecting one of the image data stored in the storage means;
setting a plurality of closed areas in the selected imaged data displayed on the display screen;
designating one of the set plurality of closed areas;
creating a synthesized image by inserting the image data that is being input in real time into the designated closed area located in the selected image data displayed on the display screen.

20. A storage medium according to claim 19, wherein in said image processing method, the closed areas are set by means of handwriting input.

21. A readable storage medium that stores commands for causing a machine to execute an image processing method comprising the steps of:
storing at least one digital image data in storage means;
inputting in real time an image of an object obtained by photographing the object, as digital image data;
storing temporarily the digital image data that is being input in real lime in a buffer;
displaying on a display screen the image data that is being input in real time and read from the buffer;
selecting one of the image data stored in the storage means;
displaying the selected image data on the display screen when the stored image is selected;
designating at least one area in the selected image data displayed on the display screen; and
creating a synthesized image by inserting the digital image data that is being input in real time and read from the buffer into the designated area located in the selected image data displayed on the display screen.

22. A storage medium according to claim 21, wherein said image processing method further comprises the step of changing a size of the predetermined area while the predetermined area is displayed on the display screen.

23. A storage medium according to claim 21, wherein said image processing method further comprises the step of saving the synthesized image and information indicative of a storage location in said storage means where the selected image data from which the synthesized image data is created is stored.

24. A readable storage medium that stores commands for causing a machine to execute an image processing method comprising the steps of:
storing at least one digital image data in storage means;
inputting in real time an image of an object obtained by photographing the object, as digital image data;
storing temporarily the digital image data that is being input in real time in a buffer;
selecting one of the image data stored in the storage means;
displaying the selected image data on a display screen;
setting at least one area in the selected image data displayed on the display screen;
setting a predetermined data in the setting area of the selected image data displayed on the display screen;
creating a synthesized image by inserting the digital image data that is being input in real time and read from said buffer into the predetermined area in which the predetermined image data has been set; and
displaying the created synthesized image on the display screen.

25. A storage medium according to claim 24, wherein said image processing method further comprises the step of selecting one of a plurality of areas when the plurality at predetermined areas are set in said area setting step and predetermined image data are set into the plurality of predetermined areas in said data setting step, and wherein the synthesized image is created by inserting the image data that is being input in real time into the selected predetermined area, and the created synthesized image is displayed on the screen.

26. A storage medium according to claim 24, wherein said image processing method further comprises the step of changing a size of the selected area.

27. A storage medium according to claim 24, wherein said image processing method further comprises the step of saving the synthesized image and information indicative of a storage location in said storage means where the selected image data from which the synthesized image data is created is stored.

28. An image processing apparatus according to claim 1, further comprising a main body, and wherein said storage unit, said input unit said display control unit, said selecting unit, said setting unit, said designating unit, and said image synthesizing unit are provided in said main body.

29. An image processing apparatus according to claim 3, further comprising a main body, and wherein said storage unit, said input unit, said display control unit, said selecting unit, said display unit, said designating unit, said generating unit, and said image synthesizing unit are provided in said main body.

30. An image processing method according to claim 10, further including a main body, and wherein said storing step, said inputting step, said displaying step, said selecting step, said setting step, said designating step, and said creating step are executed within said main body.

31. An image processing method according to claim 12, further including a main body, and wherein said storing step, said inputting step, said displaying step, said selecting step, said selected image data displaying step, said designating step, said generating step, and said creating step are executed within said main body.

32. A readable storage medium according to claim 19, further including a main body, and wherein said storing step, said inputting step, said displaying step, said selecting step said setting step, said designating step, and said creating step are executed within said main body.

33. A readable storage medium according to claim 21, further including a main body, and wherein said storing step, said inputting step, said displaying step, said selecting step, said selected image data displaying step, said designating step, said generating step, and said creating step are executed within said main body.

34. An image processing apparatus according to claim 3, wherein said designating unit designates one position in the selected image data displayed on the display position in the selected image data displayed on the displayed on the display screen, and the image processing apparatus further comprises a generating unit that generates the designated area including the designated one position.

35. An image processing method according to claim 12, further comprising the step of designating one position in the selected image data displayed on the display screen, and generating the designated area including the designated one position.

36. A storage medium according to claim 21, wherein the image processing method further comprises the steps of designating one position in the selected image data displayed on the display screen, and generating the designated area including the designated one position.

* * * * *